United States Patent
Chen et al.

(10) Patent No.: US 12,468,204 B2
(45) Date of Patent: Nov. 11, 2025

(54) DISPLAY PANEL, FABRICATION METHOD OF DISPLAY PANEL, AND DISPLAY DEVICE

(71) Applicants: Huizhou China Star Optoelectronics Display Co., Ltd., Guangdong (CN); TCL China Star Optoelectronics Technology Co., Ltd., Guangdong (CN)

(72) Inventors: Mei Chen, Guangdong (CN); Dongze Li, Guangdong (CN); Lixuan Chen, Guangdong (CN)

(73) Assignees: Huizhou China Star Optoelectronics Display Co. Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/623,915

(22) PCT Filed: Dec. 24, 2021

(86) PCT No.: PCT/CN2021/141308
§ 371 (c)(1),
(2) Date: Dec. 30, 2021

(87) PCT Pub. No.: WO2023/103107
PCT Pub. Date: Jun. 15, 2023

(65) Prior Publication Data
US 2024/0427209 A1    Dec. 26, 2024

(30) Foreign Application Priority Data
Dec. 10, 2021    (CN) .......................... 202111503953.6

(51) Int. Cl.
G02F 1/155    (2006.01)
G02F 1/1337    (2006.01)
(Continued)

(52) U.S. Cl.
CPC ........ *G02F 1/155* (2013.01); *G02F 1/133792* (2021.01); *G02F 1/136245* (2021.01);
(Continued)

(58) Field of Classification Search
CPC .............. G02F 1/155; G02F 1/133792; G02F 1/136245; G02F 1/1525; G02F 1/163; G02F 2001/1635; G02F 2201/44
See application file for complete search history.

(56) References Cited

U.S. PATENT DOCUMENTS

2003/0010957 A1* 1/2003 Haering ................. B82Y 20/00
                                                      252/500
2005/0141074 A1    6/2005 Chen
(Continued)

FOREIGN PATENT DOCUMENTS

CN    101512422    8/2009
CN    105446046    3/2016
(Continued)

OTHER PUBLICATIONS

International Search Report and the Written Opinion Dated Sep. 7, 2022 From the International Searching Authority Re. Application No. PCT/CN2021/141308 and Its Translation Into English. (20 Pages).
(Continued)

*Primary Examiner* — Nathanael R Briggs

(57) ABSTRACT

The present application provides a display panel, a fabrication method of a display panel, and a display device. The display panel includes a transparent display panel, and a dimming panel comprising a plurality of pixels for emitting light and is arranged on a side of the transparent display panel. The dimming panel includes an electrochromic layer, an electrolyte layer, and an ion storage layer stacked in sequence. The electrochromic layer and the ion storage layer
(Continued)

includes a porous structure, and the dimming panel further includes a first transparent electrode layer disposed on a side of the electrochromic layer away from the electrolyte layer, and the first transparent electrode layer is patterned and disposed corresponding to each pixel.

20 Claims, 5 Drawing Sheets

(51) Int. Cl.
    *G02F 1/1362*     (2006.01)
    *G02F 1/1523*     (2019.01)
    *G02F 1/163*     (2006.01)

(52) U.S. Cl.
    CPC ............ *G02F 1/1525* (2013.01); *G02F 1/163* (2013.01); *G02F 2001/1635* (2013.01); *G02F 2201/44* (2013.01)

(56) References Cited

U.S. PATENT DOCUMENTS

| | | | |
|---|---|---|---|
| 2007/0237898 A1* | 10/2007 | Hoeing | G02F 1/1525 427/294 |
| 2014/0240652 A1 | 8/2014 | Satoh et al. | |
| 2014/0320945 A1 | 10/2014 | Chen | |
| 2015/0177583 A1* | 6/2015 | Ding | G02F 1/133553 427/532 |
| 2015/0221283 A1 | 8/2015 | Jia et al. | |
| 2016/0349589 A1 | 12/2016 | Sun et al. | |
| 2020/0234664 A1* | 7/2020 | Li | G09G 3/38 |
| 2020/0335060 A1* | 10/2020 | Xiao | G09G 3/20 |
| 2021/0325726 A1* | 10/2021 | Chen | G02F 1/133711 |

FOREIGN PATENT DOCUMENTS

| | | |
|---|---|---|
| CN | 105759469 | 7/2016 |
| CN | 109343288 | 2/2019 |
| CN | 109633999 | 4/2019 |
| CN | 111095094 | 5/2020 |
| JP | 2011-164256 | 8/2011 |
| JP | 2020-154183 | 9/2020 |
| WO | WO 2020/253765 | 12/2020 |

OTHER PUBLICATIONS

Notification of Office Action and Search Report Dated Dec. 21, 2022 From the State Intellectual Property Office of the People's Republic of China Re. Application No. 202111503953.6 and Its Translation Into English. (21 Pages).

* cited by examiner

DISPLAY PANEL, FABRICATION METHOD OF DISPLAY PANEL, AND DISPLAY DEVICE

RELATED APPLICATIONS

This application is a National Phase of PCT Patent Application No. PCT/CN2021/141308 having International filing date of Dec. 24, 2021, which claims the benefit of priority of China Patent Application No. 202111503953.6 filed on Dec. 10, 2021. The contents of the above applications are all incorporated by reference as if fully set forth herein in their entirety.

FIELD AND BACKGROUND OF THE INVENTION

The present application relates to a display technology field, and particularly to a display panel, a fabrication of a display panel, and a display device.

With increasing demands for scene-based display, transparent display has gradually become a hot spot for developments of display devices. Compared with a traditional display screen, a transparent display screen will not block objects behind the screen when displaying information and can maintain permeability of the field of view. However, the current transparent display device does not have a black state, and has poor visibility in a strong light environment. In response to above problems, a multi-state switching display technology combining transparent display and intelligent dimming technology has been gradually developed.

Current common smart dimming technologies mainly comprise electrochromic technology, polymer dispersed liquid crystal (PDLC) technology, dye liquid crystal technology and suspended particle (SPD) technology. Among them, electrochromic technology has been widely used in architectural glass, automobile sunroof/rearview mirror, aircraft porthole and other fields due to its advantages such as wide dimming range and low driving voltage. However, due to slow response speed of electrochromic technology and the low precision of dimming in a light-emitting area, its application in the display field is limited.

SUMMARY OF THE INVENTION

The present application provides a display panel, a fabrication method of a display panel, and a display device, so as to solve problems of slow dimming response speed of a multi-state switching display panel and low light-emitting dimming accuracy of the light-emitting area.

An embodiment of the present application provides a display panel, comprising:
  a transparent display panel;
  a dimming panel, comprising a plurality of pixels for emitting light, arranged on a side of the transparent display panel, wherein the dimming panel comprises an electrochromic layer, an electrolyte layer, and an ion storage layer stacked in sequence, the electrochromic layer and the ion storage layer each have a porous structure, and the dimming panel further comprises:
  a first transparent electrode layer arranged on a side of the electrochromic layer away from the electrolyte layer, and the first transparent electrode layer is patterned and arranged corresponding to each of the pixels.

In the display panel of the present application, the electrochromic layer comprises a transparent state or a colored state, and the transparent display panel comprises a display state or a non-display state.

In the display panel of the present application, the dimming panel further comprises:
  a second transparent electrode layer arranged on a side of the ion storage layer away from the electrolyte layer.

In the display panel of the present application, the transparent display panel comprises: a switching device layer arranged on a side of the second transparent electrode layer away from the ion storage layer, and the switching device layer is provided with thin film transistors arranged in an array.

In the display panel of the present application, the dimming panel further comprises:
  an insulating layer, wherein the insulating layer is disposed on the second transparent electrode layer; and
  a switching device layer deposited on the insulating layer.

In the display panel of the present application, the transparent display panel further comprises a substrate, and the switching device layer is disposed on the substrate; and
  the dimming panel further comprises an encapsulation layer, wherein the encapsulation layer is disposed on the second transparent electrode layer, and the encapsulation layer and the substrate are bonded by an optical adhesive.

In the display panel of the present application, the first transparent electrode layer and/or the second transparent electrode layer comprises a metal laminated structure.

In the display panel of the present application, the first transparent electrode layer is an anode layer, and the second transparent electrode layer is a cathode layer.

In the display panel of the present application, a light-emitting unit is further provided on the switching device layer, and the light-emitting unit realizes light-emitting display under the driving of the switching device layer.

In the display panel of the present application, the electrolyte layer comprises one of an inorganic system, a gel system, or a solution system, and the electrochromic layer is made of porous metal oxide.

The present application further provides a fabrication method of a display panel, comprising:
  providing a transparent substrate, fabricating a first transparent electrode layer on the transparent substrate, and patterning the first transparent electrode layer at a place where corresponding to a pixel for emitting light;
  fabricating an electrochromic layer on the first transparent electrode layer, and
  processing the electrochromic layer with a hole-forming etching to form a porous structure;
  fabricating an electrolyte layer on the electrochromic layer;
  fabricating an ion storage layer on the electrolyte layer, and etching the ion storage layer to form a porous structure; and
  fabricating transparent display panel on the ion storage layer.

In the fabrication method of a display panel of the present application, prior to the step of fabricating the ion storage layer on the electrolyte layer, further comprising:
  fabricating a second transparent electrode layer on the ion storage layer.

In the fabrication method of a display panel of the present application, the step of fabricating the ion storage layer on the electrolyte layer comprises fabricating an insulating layer on the second transparent electrode layer, fabricating a switching device layer on the insulating layer; and
  fabricating a light-emitting unit on the switching device layer.

In the fabrication method of a display panel of the present application, the step of fabricating the porous structure by performing the hole-forming etching on the ion storage layer comprises:

performing the hole-forming etching on the ion storage layer by a gaseous etching, wherein a gas used for the gaseous etching comprises at least one of ammonia, hydrogen, or argon.

The present application provides a display device, comprising a display panel, wherein the display panel comprises:

a transparent display panel;

a dimming panel, comprising a plurality of pixels for emitting light, arranged on a side of the transparent display panel, wherein the dimming panel comprises an electrochromic layer, an electrolyte layer, and an ion storage layer stacked in sequence, the electrochromic layer and the ion storage layer each have a porous structure, and the dimming panel further comprises:

a first transparent electrode layer arranged on a side of the electrochromic layer away from the electrolyte layer, and the first transparent electrode layer is patterned and arranged corresponding to each of the pixels.

In the display device of the present application, the electrochromic layer comprises a transparent state or a colored state, and the transparent display panel comprises a display state or a non-display state.

In the display panel of the present application, the dimming panel further comprises:

a second transparent electrode layer arranged on a side of the ion storage layer away from the electrolyte layer.

In the display panel of the present application, the transparent display panel comprises:

a switching device layer arranged on a side of the second transparent electrode layer away from the ion storage layer, and the switching device layer is provided with a plurality of thin film transistors arranged in an array.

In the display panel of the present application, the dimming panel further comprises: an insulating layer, wherein the insulating layer is disposed on the second transparent electrode layer; and the switching device layer is deposited on the insulating layer.

In the display panel of the present application, the transparent display panel further comprises a substrate, and the switching device layer is disposed on the substrate; and the dimming panel further comprises an encapsulation layer, the encapsulation layer is disposed on the second transparent electrode layer, and the encapsulation layer and the substrate are bonded by an optical adhesive.

The beneficial effect of the present application is by arranging a dimming panel on a side of the transparent display panel, and an electrochromic layer, an electrolyte layer and an ion storage layer are arranged in the dimming panel, so that a transparent display panel can realize multi-state switching display, and the electrochromic layer and the ion storage layer in the dimming panel are formed to have a porous structure respectively to increase a contact area between the electrolyte layer with the electrochromic layer and the ion storage layer, which is conducive to improve an electrochromic response speed of the panel. A first transparent electrode layer is also provided on a side of the electrochromic layer away from the electrolyte layer, and the first transparent electrode layer corresponds to each pixel of the dimming panel is patterned, so that a single pixel can be dimmed to realize dimming of the electrochromic layer, so that the display panel can realize pixel-level dimming and improve a fineness of regulation.

BRIEF DESCRIPTION OF THE SEVERAL VIEWS OF THE DRAWINGS

In order to more clearly illustrate technical solutions in embodiments of the present disclosure, a brief description of accompanying drawings used in a description of the embodiments will be given below.

DESCRIPTION OF SPECIFIC EMBODIMENTS OF THE INVENTION

Figure 1:
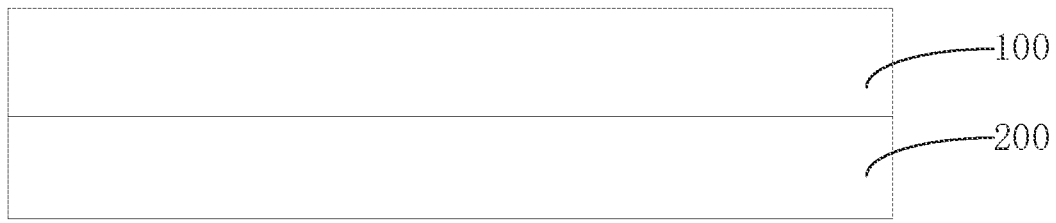
FIG. 1 is a structural schematic diagram of a display panel provided by an embodiment of the application.

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the description of this application, it should be understood that the features of the terms "first" and "second" may explicitly or implicitly comprise one or more of the features. In the description of the present application, "a plurality of" means two or more than two, unless otherwise specifically defined. It should be noted that, unless otherwise clearly specified and limited, the terms "connected" and "connected" should be understood in a broad sense. For example, they can be directly connected, or indirectly connected through an intermediary, and can be a connection between two components. Or the interaction between two elements. For those of ordinary skill in the art, the specific meanings of the above terms in this application can be understood according to specific circumstances.

The following disclosure provides many different embodiments or examples for realizing different structures of the present application. In order to simplify the disclosure of the present application, the components and settings of specific examples are described below. Of course, they are only examples, and are not intended to limit the application.

In addition, the present application may repeat reference numerals and/or reference letters in different examples. Such repetition is for the purpose of simplification and clarity, and does not indicate the relationship between the various embodiments and/or settings discussed. In addition, this application provides examples of various specific processes and materials, but those of ordinary skill in the art may be aware of the application of other processes and/or the use of other materials.

The embodiments of the present application provide a display panel, a fabrication method of the display panel, and a display device, which are respectively described in detail below.

Please refer to FIG. 1 to FIG. 7, an embodiment of the present application provides a display panel comprising a transparent display panel 100 and a dimming panel 200.

Among them, the transparent display panel 100 has a display panel for implementing transparent display. Specifically, the transparent display panel 100 may be a liquid crystal display panel (LCD), an organic light emitting semiconductor display panel (LED), a micro light emitting diode display panel (Micro/Mini LED), etc., and it is not limited thereto.

Figure 2:
FIG. 2 is a structural schematic structural diagram of a dimming panel provided by an embodiment of the application.

As shown in FIGS. 1 and 2, the dimming panel 200 is disposed on a side of the transparent display panel 100, and the dimming panel 200 comprises an electrochromic layer 23, an electrolyte layer 24, and an ion storage layer 25 stacked in sequence. The electrochromic layer 23 and the ion storage layer 25 each have a porous structure.

Among them, the electrolyte layer 24 comprises an inorganic system, a gel system, or a solution system. Specifically, taking the electrolyte layer 24 as an inorganic system as an example, the electrolyte layer 24 may be a metal oxide such as tantalum oxide (TaOx), which can be converted into a lithium salt lithium tantalate (LiTaOx) by a lithiation treatment.

The electrochromic layer 23 comprises porous metal oxide, such as tungsten oxide (WOx), and the ion storage layer 25 can be a porous metal oxide, such as NiOx or ferrocene. The electrochromic layer 23 and the ion storage layer 25 can be formed with a porous structure through a gaseous etching. The porous structure can increase a surface area of the layer, so that a contact area between the electrochromic layer 23 with the ion storage layer 25 and the electrolyte layer 24 is increased.

Herein, the dimming panel 200 further comprises a first transparent electrode layer 22. The first transparent electrode layer 22 is disposed on a side of the electrochromic layer 23 away from the electrolyte layer 24. The first transparent electrode layer 22 is arranged on an entire surface or patterned corresponding to each pixel. By arranging the first transparent electrode layer 22 on the entire surface, the process is simple, and an entire dimming surface of the electrochromic layer 23 can be conveniently realized. By patterning the first transparent electrode layer 22 corresponding to each pixel, a pixel-level dimming can be realized, that is, local diming of the electrochromic layer 23 can be realized by dimming a single pixel.

The display panel provided by the embodiment of the present application is realized by disposing the dimming panel 200 on a side of the transparent display panel 100, and the dimming panel 200 is provided with an electrochromic layer 23, an electrolyte layer 24, and an ion storage layer 25. The transparent display panel 100 can realize multi-state switching display, and the electrochromic layer 23 and the ion storage layer 25 in the dimming panel 200 respectively have a porous structure to enlarge the contact area between the electrolyte layer 24 with the electrochromic layer 23 and the ion storage layer 25, which is beneficial to improve an electrochromic response speed of the display panel. The electrochromic layer 23 is also provided with a transparent electrode layer 22 on a side away from the electrolyte layer 24. The first transparent electrode layer 22 corresponds to the patterned arrangement of each pixel of the dimming panel 200. In this way, a single pixel can be dimmed to achieve local dimming of the electrochromic layer 23, so that the display panel can realize pixel-level dimming and improve a fineness of control.

In some embodiments, the electrochromic layer 23 comprises a transparent state or a colored state, and the transparent display panel 100 comprises a display state or a non-display state. The display state is a state in which the transparent display panel 100 is in a working state and can perform image display, and the non-display state is a state in which the transparent display panel 100 is in a non-working state and cannot perform image display.

Herein, the colored state or transparent state of the electrochromic layer 23 can be achieved by controlling its light transmittance. In this embodiment, the electrochromic layer 23 is in a colored state, that is, when it is in an opaque state, for example a black state, a light transmittance range can be, for example, 0%-10%. It can be understood that when the electrochromic layer 23 is in a transparent state, that is, in a state of high light transmission, the light transmittance range thereof may be, for example, 80-100%. Specifically, by changing the different states of the electrochromic layer 23 and the transparent display panel 100, an overall display state of the panel can be switched.

Figure 3:
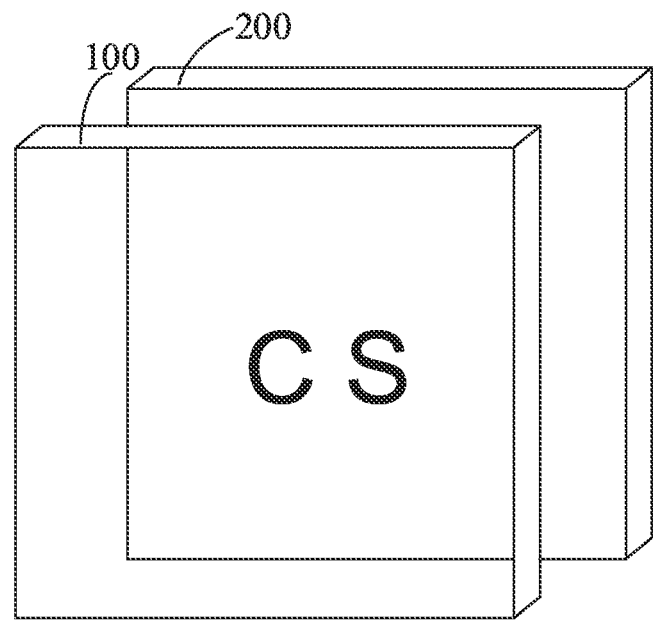
FIG. 3 is a structural schematic structural diagram of a display state of a display panel provided by an embodiment of the application.
Figure 4:
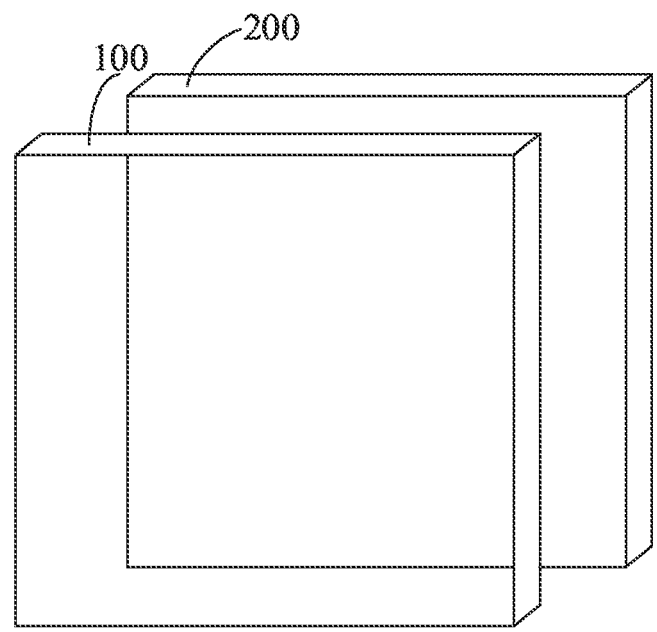
FIG. 4 is another structural schematic diagram of a display state of a display panel provided by an embodiment of the application.
Figure 5:
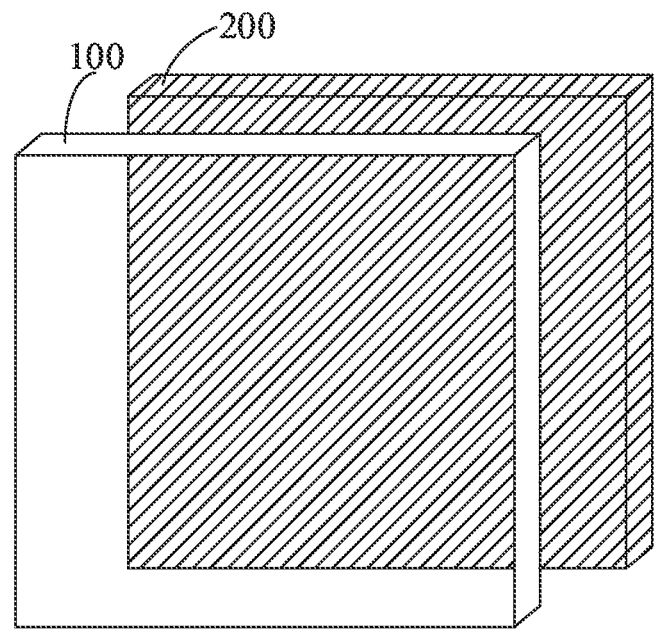
FIG. 5 is another structural schematic diagram of a display state of a display panel provided by an embodiment of the application.
Figure 6:
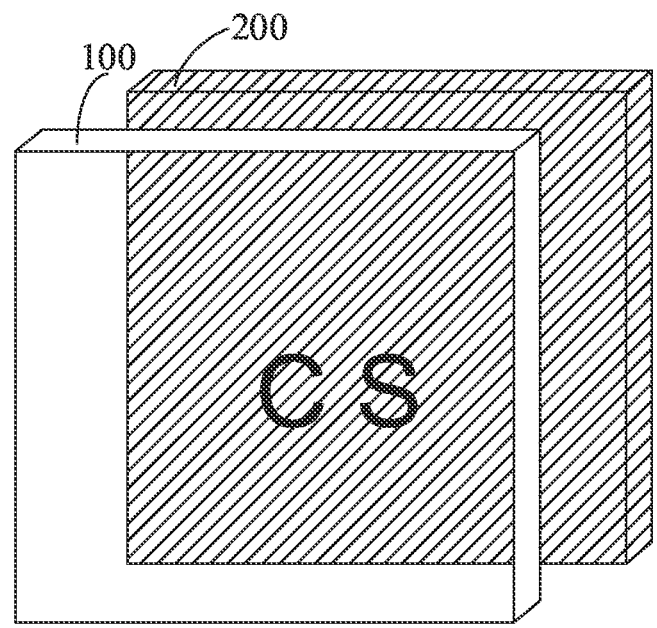
FIG. 6 is another structural schematic diagram of a display state of a display panel provided by an embodiment of the application.

For example, as shown in FIG. 3, when the electrochromic layer 23 is in a transparent state and the transparent display panel 100 is in a display state, the display panel as a whole is in a transparent display state. As shown in FIG. 4, when the electrochromic layer 23 is in a transparent state, and the transparent display panel 100 is in a non-display state, the display panel as a whole is in a transparent non-display state. As shown in FIG. 5, when the electrochromic layer 23 is in a colored state, and the transparent display panel 100 is in a non-display state, the display panel as a whole is in a privacy display state. As shown in FIG. 6, when the electrochromic layer 23 is in a colored state and the transparent display panel 100 is in a display state, the display panel as a whole presents a high-contrast display state.

By setting the colored state of the electrochromic layer 23 to be switchable, it is possible to realize the switching of multiple display states of the display panel, so that the display panel can meet application requirements of multiple scenarios. It should be noted that an adjustment of the transparent state or the colored state of the electrochromic layer 23 can be adjustment of the entire surface. For example, an entire surface of the electrochromic layer 23 can be adjusted to a transparent state or in a colored state. The electrochromic layer 23 may also be adjusted locally, that is, different pixel areas have different states. For example, the electrochromic layer 23 may be adjusted to the pixel area of the display area corresponding to the displayed image in the coloring state, and the pixel area corresponding to the non-display area outside the displayed image is adjusted to a transparent state, etc.

Figure 7:
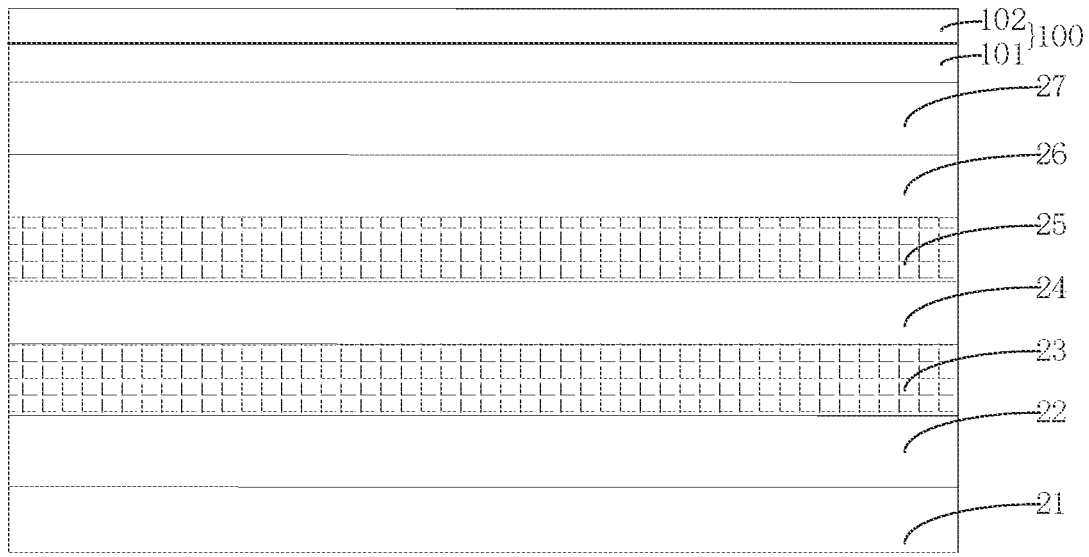
FIG. 7 is another structural schematic diagram of a display panel provided by an embodiment of the application.

In some embodiments, as shown in FIG. 7, the dimming panel 200 further comprises a second transparent electrode layer 26. Herein, the first transparent electrode layer 22 may be one of a cathode layer or an anode layer, and the second transparent electrode layer 26 may correspondingly be the other of the cathode layer or the anode layer. In this embodiment, the first transparent electrode layer 22 is an anode layer, and the second transparent electrode layer 26 is a cathode layer.

Herein, the second transparent electrode layer 26 is disposed on a side of the ion storage layer 25 away from the electrolyte layer 24. Among them, the first transparent electrode layer 22 and the second transparent electrode layer 26 are used to control a color of the electrochromic layer 23, so as to realize a switching of a state of the display panel of an embodiment of the present application.

The first transparent electrode layer 22 and/or the second transparent electrode layer 26 may have a single-layer structure or a metal laminated structure. Specifically, the first transparent electrode layer 22 or the second transparent electrode layer 26 may be a three-layered structure composed of indium tin oxide (ITO) and metal, for example, an ITO/metal/ITO structure, wherein a film thickness of the layers ITO may be 10-200 nm, and the metal may have a film thickness of 5-20 nm. The metal material comprises but is not limited to Ag. Al, or silver alloy.

In some embodiments, the transparent display panel 100 comprises a switching device layer 101. The switching device layer 101 is provided on a side of the second transparent electrode layer 26 away from the ion storage layer 25, and the switching device layer 101 is provided with thin film transistors arranged in an array. Among them, the thin film transistors are used to drive the transparent display panel 100 to achieve a display state.

In some embodiments, please continue to refer to FIG. 7, the dimming panel 200 further comprises an insulating layer 27, and the insulating layer 27 is disposed on the second transparent electrode layer 26. Among them, the insulating layer 27 is used to achieve insulation between the second transparent electrode layer 26 and the switching device layer 101, and a material of the insulating layer 27 is, for example, an inorganic insulating layer, such as silicon oxide, silicon nitride, silicon oxynitride, etc., silicon nitride or silicon oxynitride, etc., and it is not limited thereto.

The switching device layer 101 is deposited on the insulating layer 27. The switching device layer 101 is a switching device layer of the transparent display panel 100, and a light emitting unit 102 may be prepared on the switching device layer 101. The light emitting unit 102 is driven by the switching device layer 101 to realize the light emitting display of the light emitting unit 102, wherein the light emitting unit 102 may be an OLED light-emitting unit, an LCD light-emitting unit, a Micro LED light-emitting unit, or a Mini LED light-emitting unit, etc., which is not specifically limited herein.

After fabricating the second transparent electrode layer 26 of the dimming panel 200, the insulating layer 27 is fabricated, and then the switching device layer 101 of the transparent display panel 100 is subsequently fabricated, so that the dimming panel 200 and the transparent display panel 100 are integrally formed without additional uses of a connection structure such as a sealant, which helps reduce an overall thickness of the display panel and facilitates the realization of the thinning of the display panel.

Figure 8:
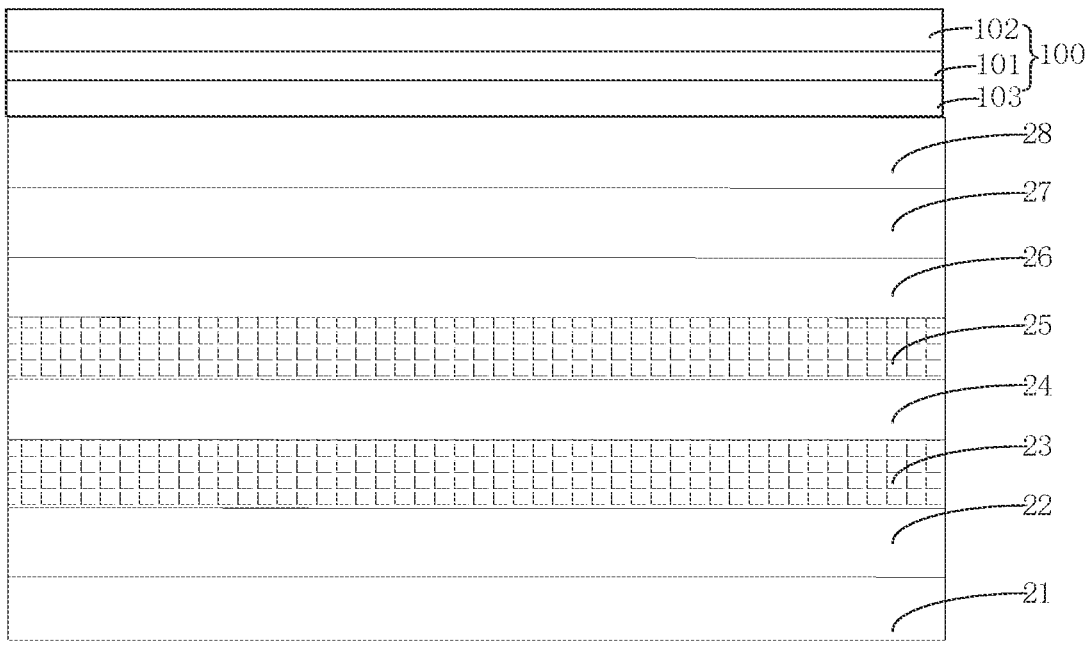
FIG. 8 is another structural schematic diagram of a display panel provided by an embodiment of the application.

In some embodiments, referring to FIG. 8, the transparent display panel 100 further comprises a substrate 103 and an encapsulation layer 28.

The switching device layer 101 is disposed on the substrate 103, the encapsulation layer 28 is disposed on the second transparent electrode layer 26, and an optical adhesive (OCA) is used to adhere the encapsulation layer 28 and the substrate 103. Among them, the encapsulation layer 28 is a transparent resin or a transparent cover glass, so as to protect the panel while facilitating the realization of transparent display. By separately bonding the finished transparent display panel 100 and the dimming panel 200 through the optical glue, a rapid assembly of the display panel can be realized, and the process is simple.

Figure 9:
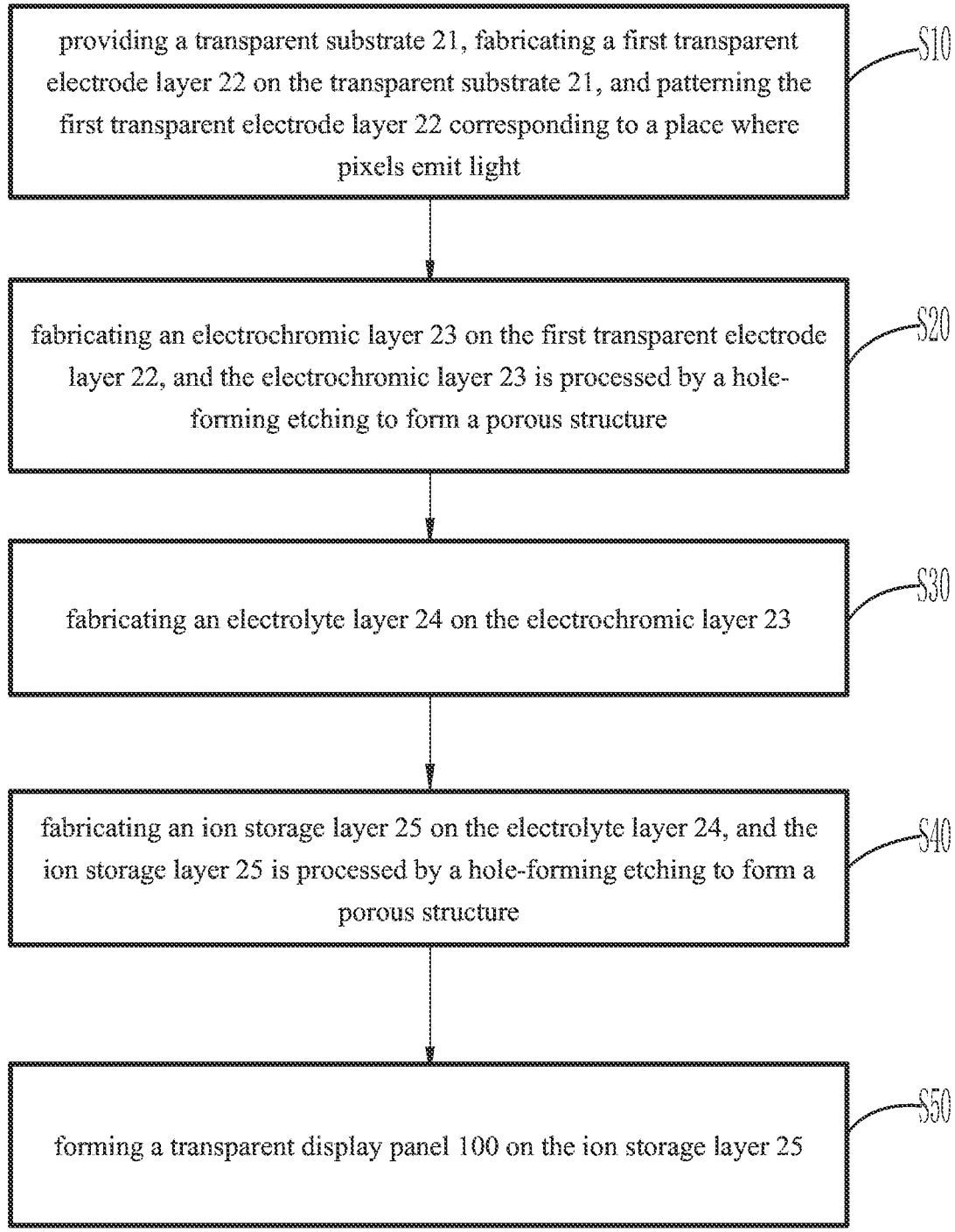
FIG. 9 is a schematic diagram of a flowchart of a fabrication method of a display panel provided by an embodiment of the application.

On the other hand, in order to better implement the display panel of the present application, an embodiment of the present application also provides a fabrication method of a display panel, as shown in FIG. 9, comprising following steps S10-S50:

Step S10: providing a transparent substrate 21, fabricating a first transparent electrode layer 22 on the transparent substrate 21, and patterning the first transparent electrode layer 22 corresponding to a place where pixels emit light.

Herein, the first transparent electrode layer 22 is used to control the light emission of pixels, the first transparent electrode layer 22 is a transparent conductive metal film, and the first transparent electrode layer 22 may be a single-layer structure or a multi-layer structure. Taking the single-layer structure of the first transparent electrode layer 22 as an example, the first transparent electrode layer 22 may be made of indium tin oxide (ITO) material. Taking the multi-layer structure of the first transparent electrode layer 22 as an example, the first transparent electrode layer 22 can be a three-layered structure composed of indium tin oxide (ITO) and metal, such as an ITO/metal/ITO structure, and a metal material comprising but not limited to Ag. Al or silver alloys. Herein, the first transparent electrode layer 22 can be patterned on the first transparent electrode layer 22 by using a photolithography process.

Step S20: fabricating an electrochromic layer 23 on the first transparent electrode layer 22, and the electrochromic layer 23 is processed by a hole-forming etching to form a porous structure.

Specifically, the electrochromic layer 23 can be made of a metal oxide such as tungsten oxide (WOx). When the electrochromic layer 23 is processed by the hole-forming etching, a gaseous etching method can be used, which is used for etching. The gas for etching can comprises at least one of ammonia, hydrogen or argon, that is, it can be a pure gas or a mixed gas formed by multiple gases.

Step S30: fabricating an electrolyte layer 24 on the electrochromic layer 23.

Herein, the electrolyte layer 24 may be made of a metal oxide such as tantalum oxide (TaOx), and after fabrication, it is made into a lithium salt (LiTaOx) by a lithiation treatment. It is noted that the electrolyte layer 24 can also be made of a material in which the electrolyte layer 24 is an inorganic system, a gel system, or a solution system.

Step S40: fabricating an ion storage layer 25 on the electrolyte layer 24, and the ion storage layer 25 is processed by a hole-forming etching to form a porous structure.

Specifically, the ion storage layer 25 can be made of a metal oxide such as nickel oxide (NiOx) or ferrocene. When the ion storage layer 25 is etched to form holes, a gas etching method can be used. The gas used for etching can comprise at least one of ammonia, hydrogen or argon, that is, it can be a pure gas or a mixed gas formed by multiple gases.

Step S50: forming a transparent display panel 100 on the ion storage layer 25.

The fabrication method of the display panel provided by the embodiment of the present application is by arranging the dimming panel 200 on a side of the transparent display panel 100, and the dimming panel 200 is provided with an electrochromic layer 23, an electrolyte layer 24 and an ion storage layer 25, In this way, it is realized that the transparent display panel 100 can realize multi-state switching display, and the electrochromic layer 23 and the ion storage layer 25 in the dimming panel 200 respectively have a porous structure, and the arrangement of the porous structure is able to increase a contact area between the electrolyte layer 24 with the electrochromic layer 23 and the ion storage layer 25, thereby providing more active sites for the charge transfer reaction, and the uniform porous structure is conducive to the insertion and deintercalation of ions, which is beneficial to improve the electrochromic response speed of the panel.

In some embodiments, the step S50, prior to fabricating the transparent display panel 100 on the ion storage layer 25, further comprises:

Step 1: fabricating a second transparent electrode layer 26 on the ion storage layer 25.

Herein, the second transparent electrode layer 26 is disposed on a side of the ion storage layer 25 away from the electrolyte layer 24. Among them, the first transparent electrode layer 22 and the second transparent electrode layer 26 are used to control a color of the electrochromic layer 23, so as to realize the switching of the state of the display panel of the embodiment of the present application.

In some embodiments, the step S50 of fabricating a transparent display panel 100 on the ion storage layer 25 specifically further comprises:

Step 51: fabricating an insulating layer 27 on the second transparent electrode layer 26.

Step 52: fabricating a switching device layer 101 the insulating layer 27.

Step 53: fabricating a light-emitting unit 102 is on the switching device layer 101.

The switching device layer 101 is used to drive the light-emitting unit 102 to emit light and display. After fabricating the second transparent electrode layer 26 of the dimming panel 200, the insulating layer 27 is fabricated, and then the switching device layer 101 of the transparent display panel 100 is subsequently fabricated, so that the dimming panel 200 and the transparent display panel 100 are integrally formed without additional uses of a connection structure such as a sealant, thereby reducing an overall thickness of the display panel and facilitates the realization of the thinning of the display panel.

In order to better implement the display panel of the present application, an embodiment of the present application further provides a display device, and the display device comprises the above-mentioned display panel. Since the display device has the above-mentioned display panel, it has all the same beneficial effects, which will not be repeated in this embodiment. The embodiments of this application do not impose specific restrictions on the application of the display device, which can be televisions, laptops, tablets, wearable display devices (such as smart bracelets, smart watches, etc.), mobile phones, virtual reality devices, any product or component with display function, such as reality equipment, vehicle display, advertising light box, etc.

In the above-mentioned embodiments, the description of each embodiment has its own focus. For parts that are not described in detail in an embodiment, reference may be made to related descriptions of other embodiments. During specific implementation, each of the above units or structures can be implemented as independent entities, or in any combination, and implemented as the same or several entities. For the specific implementation of each of the above units or structures, please refer to the previous method embodiments.

The above is a detailed introduction to a display panel, a fabrication method of a display panel, and a display device provided by the embodiments of the present application. Specific examples are used in this article to illustrate the principles and implementations of the present application. The description of the above embodiments is only used to help understand the present application The method of application and its core idea; meanwhile, for those skilled in the art, according to the idea of this application, there will be changes in the specific implementation and the scope of application. In summary, the content of this specification should not be understood as Restrictions on this application.

What is claimed is:

1. A display panel, comprising:
   a transparent display panel;
   a dimming panel, comprising a plurality of pixels for emitting light, arranged on a side of the transparent display panel, wherein the dimming panel comprises an electrochromic layer, an electrolyte layer, and an ion storage layer stacked in sequence, the electrochromic layer and the ion storage layer each have an etched porous structure to enlarge a contact area between the electrolyte layer with the electrochromic layer and the ion storage layer, and the dimming panel further comprises:
   a first transparent electrode layer arranged on a side of the electrochromic layer away from the electrolyte layer, and the first transparent electrode layer is patterned and arranged corresponding to each of the pixels.

2. The display panel of claim 1, wherein the electrochromic layer comprises a transparent state or a colored state, and the transparent display panel comprises a display state or a non-display state.

3. The display panel of claim 1, wherein the dimming panel further comprises:
   a second transparent electrode layer arranged on a side of the ion storage layer away from the electrolyte layer.

4. The display panel of claim 3, wherein the transparent display panel comprises:
   a switching device layer arranged on a side of the second transparent electrode layer away from the ion storage layer, and the switching device layer is provided with thin film transistors arranged in an array.

5. The display panel of claim 4, wherein the dimming panel further comprises:
   an insulating layer, wherein the insulating layer is disposed on the second transparent electrode layer; and
   a switching device layer deposited on the insulating layer.

6. The display panel of claim 5, wherein the transparent display panel further comprises a substrate, and the switching device layer is disposed on the substrate; and
   the dimming panel further comprises an encapsulation layer, wherein the encapsulation layer is disposed on the second transparent electrode layer, and the encapsulation layer and the substrate are bonded by an optical adhesive.

7. The display panel of claim 3, wherein the first transparent electrode layer and/or the second transparent electrode layer comprises a metal laminated structure.

8. The display panel of claim 7, wherein the first transparent electrode layer is an anode layer, and the second transparent electrode layer is a cathode layer.

9. The display panel according to claim 4, wherein a light-emitting unit is further provided on the switching device layer, and the light-emitting unit realizes light-emitting display under the driving of the switching device layer.

10. The display panel of claim 1, wherein the electrolyte layer comprises one of an inorganic system, a gel system, or a solution system, and the electrochromic layer is made of porous metal oxide.

11. A fabrication method of a display panel, which comprises:
providing a transparent substrate, fabricating a first transparent electrode layer on the transparent substrate, and patterning the first transparent electrode layer at a place where corresponding to a pixel for emitting light;
fabricating an electrochromic layer on the first transparent electrode layer, and processing the electrochromic layer with a hole-forming etching to form a porous structure;
fabricating an electrolyte layer on the electrochromic layer;
fabricating an ion storage layer on the electrolyte layer, and etching the ion storage layer to form a porous structure; and
fabricating a transparent display panel on the ion storage layer.

12. The fabrication method of the display panel according to claim 11, wherein prior to the step of fabricating the ion storage layer on the electrolyte layer, further comprising:
fabricating a second transparent electrode layer on the ion storage layer.

13. The fabrication method of the display panel according to claim 11, wherein the step of fabricating the ion storage layer on the electrolyte layer comprises:
fabricating an insulating layer on the second transparent electrode layer;
fabricating a switching device layer on the insulating layer; and
fabricating a light-emitting unit on the switching device layer.

14. The fabrication method of the display panel according to claim 11, wherein the step of fabricating the porous structure by performing the hole-forming etching on the ion storage layer comprises:
performing the hole-forming etching on the ion storage layer by a gaseous etching, wherein a gas used for the gaseous etching comprises at least one of ammonia, hydrogen, or argon.

15. A display device, comprising a display panel, wherein the display panel comprises:
a transparent display panel;
a dimming panel, comprising a plurality of pixels for emitting light, arranged on a side of the transparent display panel, wherein the dimming panel comprises an electrochromic layer, an electrolyte layer, and an ion storage layer stacked in sequence, the electrochromic layer and the ion storage layer each have an etched porous structure to enlarge a contact area between the electrolyte layer with the electrochromic layer and the ion storage layer, and the dimming panel further comprises:
a first transparent electrode layer arranged on a side of the electrochromic layer away from the electrolyte layer, and the first transparent electrode layer is patterned and arranged corresponding to each of the pixels.

16. The display device of claim 15, wherein the electrochromic layer comprises a transparent state or a colored state, and the transparent display panel comprises a display state or a non-display state.

17. The display device of claim 15, wherein the dimming panel further comprises:
a second transparent electrode layer arranged on a side of the ion storage layer away from the electrolyte layer.

18. The display device of claim 17, wherein the transparent display panel comprises:
a switching device layer arranged on a side of the second transparent electrode layer away from the ion storage layer, and the switching device layer is provided with a plurality of thin film transistors arranged in an array.

19. The display device of claim 18, wherein the dimming panel further comprises:
an insulating layer, wherein the insulating layer is disposed on the second transparent electrode layer; and
the switching device layer is deposited on the insulating layer.

20. The display device of claim 19, wherein the transparent display panel further comprises a substrate, and the switching device layer is disposed on the substrate; and
the dimming panel further comprises an encapsulation layer, the encapsulation layer is disposed on the second transparent electrode layer, and the encapsulation layer and the substrate are bonded by an optical adhesive.

* * * * *